United States Patent
Kammerloher (10) Patent No.: US 10,676,704 B2
(45) Date of Patent: Jun. 9, 2020

(54) APPARATUS AND METHOD FOR THE RECOVERY OF ENERGY

(75) Inventor: Helmut Kammerloher, Freising (DE)

(73) Assignee: KRONES AG, Neutraubling (DE)

( * ) Notice: Subject to any disclaimer, the term of this patent is extended or adjusted under 35 U.S.C. 154(b) by 921 days.

(21) Appl. No.: 13/517,993

(22) PCT Filed: Dec. 22, 2010

(86) PCT No.: PCT/EP2010/007890
§ 371 (c)(1),
(2), (4) Date: Jul. 19, 2012

(87) PCT Pub. No.: WO2011/076410
PCT Pub. Date: Jun. 30, 2011

(65) Prior Publication Data
US 2013/0000863 A1    Jan. 3, 2013

(30) Foreign Application Priority Data
Dec. 23, 2009   (DE) ................. 10 2009 055 300

(51) Int. Cl.
*C12C 7/22* (2006.01)
*C12C 7/06* (2006.01)
(Continued)

(52) U.S. Cl.
CPC ............ *C12C 7/22* (2013.01); *C12C 7/067* (2013.01); *C12C 7/26* (2013.01); *C12C 13/00* (2013.01);
(Continued)

(58) Field of Classification Search
CPC .. C12C 7/22; C12C 7/26; C12C 13/00; C12C 7/067; C12C 7/20; C12C 7/044; F28D 20/0039; Y02E 60/142
(Continued)

(56) References Cited

U.S. PATENT DOCUMENTS 2,414,669 A * 1/1947 Reich .................. C12C 7/00
426/29
2,495,625 A * 1/1950 Bodinus .................. C12C 7/26
62/114
(Continued)

FOREIGN PATENT DOCUMENTS

CN    1774498 A    5/2006
CN    1815132 A    8/2006
(Continued)

OTHER PUBLICATIONS

Notification of an Office Action, The State Intellectual Property Office of P.R. China, Application No. 201080064679.0, dated Jan. 26, 2014.
(Continued)

*Primary Examiner* — Tho V Duong
*Assistant Examiner* — Raheena R Malik
(74) *Attorney, Agent, or Firm* — Marshall, Gerstein & Borun LLP (57) ABSTRACT

A device and method for recovering energy from a hot medium, in particular from hot wort or hot mash for a beer brewery, including a first heat exchanger device for a heat transfer medium that is arranged in particular downstream of a device for heating, boiling or keeping wort or mash warm and is designed such that the heat transfer medium can be heated while cooling preferably wort or mash, wherein at least one heat consumer of the brewery is heated with the heat transfer medium. The heat transfer medium cooled down during heating the heat consumer can be recirculated to the first heat exchanger device in the circuit.

5 Claims, 5 Drawing Sheets

(51) Int. Cl.
*C12C 7/26* (2006.01)
*C12C 13/00* (2006.01)
*F28D 20/00* (2006.01)

(52) U.S. Cl.
CPC ........ *F28D 20/0039* (2013.01); *Y02E 60/142* (2013.01)

(58) Field of Classification Search
USPC ........................................................ 165/48.1
See application file for complete search history.

(56) References Cited

U.S. PATENT DOCUMENTS

| | | | | | |
|---|---|---|---|---|---|
| 2,555,938 | A | * | 6/1951 | Seligman | C12C 7/22 426/492 |
| 3,001,467 | A | * | 9/1961 | Stackler | C12C 3/00 165/138 |
| 3,453,114 | A | * | 7/1969 | Bayne | C12C 5/002 426/231 |
| 4,376,109 | A | * | 3/1983 | Wolter | B01D 5/00 165/47 |
| 4,388,857 | A | * | 6/1983 | Korek | C12C 7/22 426/29 |
| 4,483,881 | A | * | 11/1984 | Lenz | C12C 7/22 426/600 |
| 5,787,720 | A | * | 8/1998 | Lenz | C12C 5/002 62/238.3 |
| 2005/0003041 | A1 | * | 1/2005 | Kamil | C12C 7/00 426/16 |
| 2007/0134387 | A1 | * | 6/2007 | Stippler | C12C 7/20 426/523 |
| 2010/0209586 | A1 | * | 8/2010 | Imashuku | A23L 2/56 426/592 |
| 2011/0033585 | A1 | | 2/2011 | Wasmuht et al. | |
| 2011/0035990 | A1 | * | 2/2011 | Kammerloher | C10G 2/32 44/311 |
| 2011/0271953 | A1 | * | 11/2011 | Wortmann | F28D 20/0034 126/619 |
| 2012/0017497 | A1 | * | 1/2012 | Kammerloher | C10J 3/20 44/457 |
| 2012/0067047 | A1 | * | 3/2012 | Peterson | C02F 1/22 60/651 |
| 2012/0093992 | A1 | * | 4/2012 | Gattermeyer | C12C 7/22 426/492 |
| 2013/0000863 | A1 | | 1/2013 | Kammerloher | |

FOREIGN PATENT DOCUMENTS

| | | |
|---|---|---|
| CN | 101146906 A | 3/2008 |
| CN | 201056559 Y | 5/2008 |
| CN | 101443440 A | 5/2009 |
| DE | 136796 A1 | 8/1979 |
| DE | 3024809 A1 | 2/1982 |
| DE | 3338576 A1 | 5/1985 |
| DE | 3711251 A1 | 10/1988 |
| DE | 3147620 C1 | 6/1991 |
| DE | 4304975 C1 * | 3/1994 ............ C12C 7/065 |
| DE | 4304975 C1 | 3/1994 |
| DE | 19812792 A1 | 9/1999 |
| DE | 10139427 A1 | 3/2003 |
| DE | 202005020713 U1 | 10/2006 |
| DE | 10 2005021782 A1 | 11/2006 |
| DE | 102007052471 A1 | 5/2009 |
| DE | 102007054429 A1 | 5/2009 |
| EP | 0080706 A2 | 6/1983 |
| EP | 0285009 A2 | 10/1988 |
| EP | 0611819 A2 | 8/1994 |
| EP | 0724014 A2 | 7/1996 |
| EP | 2516614 A1 | 10/2012 |
| GB | 848641 A | 9/1960 |
| JP | S63123369 A | 5/1988 |
| JP | 2007095872 A | 4/2007 |
| JP | 2011130195 A | 6/2011 |
| WO | WO-00/27992 A1 | 5/2000 |
| WO | WO-2009/062597 A2 | 5/2009 |
| WO | WO-2011/026591 A1 | 3/2011 |
| WO | WO-2011/076410 A1 | 6/2011 |

OTHER PUBLICATIONS

Notification of the Second Office Action, Application No. 201080064679.0, dated Jan. 26, 2014.
Notice of Reasons for Rejection, Japanese Patent Office, Patent Application No. P2012-545161, dated Jun. 16, 2014.
Notification of First Office Action, The State Intellectual Property Office of P.R. China, Application No. 201080064679.0, dated Jun. 3, 2013.
Zacharias P: "Abnahmemessungen an Wurzekuhlern. Ergebnisse, Mangel, Richtwerte, Folgerungen für die Praxis", Brauwelt, Nuernberg, DE, vol. 137, No. 42, Jan. 1, 1997, pp. 1936-1943, XP008136190, ISSN: 0724-696X, S. 1940: "Zweistufige Wurzekuhlung" figure 5.
German Search Report for 10 2009 055 300.2, dated Jun. 21, 2010.
A. Van Den Boogaart, "s-Hertogenbosch Brew house 4 Thermal vapour compression combined with wort vapour condensation," Heineken Technical Services, Issue 1, Sep. 4, 2002.
Auxiliary request 1 [amended] claims (as maintained) from Opposition Proceedings for European U.S. Pat. No. 2516614, with translation.
Interlocutory Decision in Opposition Proceedings for German Application No. 107987380, dated Dec. 4, 2017, with translation.
Opposition of BrauKon GmbH for European Patent No. 2516614, dated Oct. 20, 2015, with translation.
Opposition of Ziemann Holvrieka for European Patent No. 2516614, dated Oct. 21, 2015, with translation.

* cited by examiner

APPARATUS AND METHOD FOR THE RECOVERY OF ENERGY

CROSS-REFERENCE TO RELATED APPLICATION

The present application claims the benefit of priority of International Patent Application No. PCT/EP2010/007890, filed Dec. 22, 2010, which application claims priority of German Application No. 10 2009 055 300.2, filed Dec. 23, 2009. The entire text of the priority application is incorporated herein by reference in its entirety.

FIELD OF THE DISCLOSURE

The disclosure relates to an apparatus and a method for the recovery of energy, preferably from hot wort or hot mash, for a beer brewery.

BACKGROUND

The production of beer requires great amounts of energy. To this end, mainly primary energy is used and degraded, with the simultaneous formation of $CO_2$. Especially the mashing process and the wort-boiling process require great amounts of energy.

In order to reduce the use of primary energy, it was already attempted in the past to recover energy and reuse it elsewhere in the process. An important example is here the recovery of energy from vapors, which arises during the boiling of wort and which is then used again for preheating the wort in the next brewing process.

After the thermal treatment, e.g. the boiling the wort, the wort has a maximum temperature, and is then cooled down to the pitching temperature (e.g. <15° C.). To this end, different facilities and systems are used. The cooling of the hot wort to the pitching temperature may be accomplished by means of plate heat exchangers. Fresh water, or fresh water (ice water) cooled down, for example, to 6° C., is then preferably heated to 75 to 88° C. The heated water is then subjected to further use, for example in the brewing water tank, e.g. for mashing or sparging.

The hot brewing water produced during the above-described cooling of the wort exceeds in many cases the hot water demand of the whole brewery. Especially in hotter regions, or toward the middle or end of the production week, there is a clear hot water surplus in the brewing water tank. Frequently, the brewing water tank contains so much energy that hot water has to be discarded through the gully. If draining of a large amount of hot water through the channel is impossible or not permitted, the hot water amount produced during the cooling of the wort has to be reduced (cooled down) with a great use of energy (mainly electric energy) by employing a cooler. Hence, it is not surprising that the refrigeration plant accounts for approximately 40% and more of the total current demand of a brewery. Summarizing, it is noted that the known methods involve a destruction of valuable resources due to the partly massive overproduction of hot water and the high expenditure in terms of system engineering and energy required for the removal thereof, as the hot water surplus can only be removed by using a great amount of energy and/or by destroying an enormous amount of heat, along with the wastage of fresh water. Hence, the known methods show great deficiencies with respect to energy efficiency and environmental friendliness.

Also, greater amounts of raw fruit or decoction mash or, respectively, amounts of mash whose hot temperature is maintained, frequently hold a great amount of energy which is not utilized and needs to be carried off.

SUMMARY OF THE DISCLOSURE

Based on the foregoing, it is one aspect of the present disclosure to improve the energy balance in a brewery, and specifically in a brewhouse process.

The present disclosure allows the effective absorption and recovery of an energy surplus in thermally treated media, for example, the thermal energy produced as the wort is cooled down to the pitching temperature. The amount of heat released as the wort cools down may be effectively used, at least partially, for heating one or more heat consumers. Thus, the heating of the heat consumer, e.g. a heating device of a mashing device, requires no or only a small portion of primary energy. This means that up to about 40% of primary energy may be additionally saved in the overall brewhouse process, while a surplus of hot brewing water can be prevented at the same time. In other words, at least 60% (up to 100%), for example, of the amount of heat required to heat a heat consumer can be covered by the amount of heat gained in the first heat exchanger device as the hot medium is cooled down.

The apparatus according to the disclosure further has the advantage that the premium energy (in terms of temperature the upper portion of the total energy) is extracted through a separate heat transfer medium circuit. In other words, with water being the commonly used heat transfer medium, the system is not constantly subjected to new minerals, so that the deposit thereof, or calcification, can be effectively prevented. For reasons of food hygiene, too, it is an advantage if the hot water circuit or brewing water circuit, respectively, and the heat transfer medium circuit or heating medium circuit, respectively, are separated.

Due to the closed heat transfer medium circuit the feeding of fresh water is not required, reducing both costs for water and disposal. Moreover, it is environment-friendly.

That is, the energy stored in the hot wort can be effectively used to heat up the heat transfer medium to a high temperature level. The apparatus is easy to integrate in already existing systems, even if they make use of other heat transfer media (e.g. vapor-operated breweries), and it is easy to retrofit. The above-described energy swing allows the heat transfer medium to be brought over and over again to a sufficiently high temperature in order to heat a heat consumer, after the heat transfer medium had been cooled down sufficiently in the heat consumer, e.g. the heating device.

The first heat exchanger device is provided, in the process direction, downstream of a device for heating or boiling or keeping hot a hot medium. The hot medium may be wort or mash. The energy may also be recovered from other media used in the brewery, however, e.g. last runnings, rinsing water, cleaning medium, trub, but also from a thermal solar system.

Advantageously, the heat transfer medium is brought to a high temperature level, e.g. T1>85° C., specifically T1>90° C., in the first heat exchanger device. These temperatures allow heating of the heat consumers by the heat transfer medium, even without an additional direct or indirect primary energy heat input.

According to a preferred embodiment the cooling of the hot medium, e.g. of the wort to the pitching temperature, involves not only a first heat exchanger device, but a second heat exchanger device, which is adapted such that water can be heated up to a temperature of T2<T1, specifically to not more than the brewing water temperature, while the wort or the mash is cooled down, wherein preferably a brewing water tank is provided in which the heated water can be stored. Of course, the temperature T2 can also be slightly higher, e.g. by up to 15 degrees, than the temperature in the brewing water tank. This means that both the brewing water and a heat transfer medium can be heated separately while the wort is cooled down. That is, when the wort is cooled down to the pitching temperature, a total amount of heat $Q_G$ is extracted from the wort, wherein the second heat exchanger device extracts an amount of heat $Q_2$ heating water to a temperature that is preferably ≤ the brewing water temperature, and the first heat exchanger device extracts an amount of heat $Q_1=Q_G-Q_2$. This step allows a significant reduction of the hot water surplus. In other words, the brewing water can be heated effectively, while the frequent energy surplus can be effectively used to heat up a heat transfer medium to a high temperature level.

In most cases, the amount of heat extracted by the first heat exchanger device corresponds to the surplus of thermal energy which is not used for the heating of water and brewing water.

According to a preferred embodiment the first heat exchanger device is connected to an energy storage tank, preferably a single one, in which the heat transfer medium heated by the heat exchanger device is stored temporarily. Preferably, also the heat transfer medium cooled down in the heat consumer can be stored in this energy storage tank.

It is a particular advantage if the energy storage tank is designed as a stratified storage device, such that the heat transfer medium can be stored and withdrawn at different heights, automatically or selectively, e.g. by means of a strata loading pipe and/or (a) mixing valve(s). The plurality of storage and withdrawal ports allow the heat transfer medium to be withdrawn from the energy storage tank at a predetermined temperature, or a heat transfer medium having a specific temperature can be selectively stored in the tank at a specific position. This results in a simplified and reliable process management. The stratified storage device thus allows the use of different heat suppliers and heat consumers. Due to the fact that the heat consumer is preferably heated with hot water, and not for example with vapor or high-pressure hot water (HDHW), an ordinary water tank may be used as energy storage tank. This means that it is not necessary to use a pressure vessel, which significantly reduces costs. Also, it is possible that a heat consumer is provided with a heat exchanger surface, which is operated with hot water (e.g. the rib heating surface of a mash vessel), and with another heat exchanger surface, which is operated with primary energy, e.g. vapor or high-pressure hot water (e.g. the bottom heating surface of a mash vessel).

Hence, it is particularly advantageous if the apparatus comprises a device for setting a predetermined constant temperature T4 of the heat transfer medium (i.e. the temperature prior to the entry into the heat exchanger device). Such a device can include, for example, one or more mixing valve(s). The mixing valve(s) can then selectively mix the heat transfer medium, which is withdrawn at various withdrawal ports of a stratified storage device, such that a predetermined temperature T4 is generated. Preferably, temperature T4 is constant, or is within a constant range, such that an energy swing with an equalized energy balance can be realized, regardless of fluctuations in the energy consumption by the heat consumer(s). The setting of the temperature T4 may be accomplished by a temperature controller not explicitly shown.

For storing a heat transfer medium at a specific height—corresponding to a temperature of the heat transfer medium—the apparatus may comprise a strata loading pipe.

The heat consumer is, for example, a heat consumer of the following group: heating device of a mashing device, lauter wort heater, wort boiling or keeping hot device, CIP-(cleaning-in-process)-consumer for heating the CIP cleaning liquid, flash pasteurizer (KZE), for example, for beer, or a heating device for the cleaning medium of a bottle washing machine.

According to a preferred embodiment a device capable of additionally heating or post-heating the heat transfer medium is provided between the first heat exchanger device and the heat consumer. Such a device may be activated additionally to supply additional energy/temperature in specific borderline cases. For example, the losses occurred on a weekend may be compensated at the beginning of a new week, etc.

Also, at least one further additional heat exchanger may be provided, which preheats, heats or post-heats the brewing water. The amount of heat for heating the water is gained from an energy surplus or waste heat, specifically from hot water vapor from the kettle vapor condenser, or hot water from the tunnel pasteurizer, the flash pasteurizer or, for example, also from a thermal solar system. In other words, if no more excess hot water is present in the hot water tank by virtue of the energy swing according to the disclosure, but if there rather is a "hot water shortage", thermal energy can be additionally supplied to the brewing water.

The inventive method for the recovery of energy from a hot medium, specifically from hot wort or hot mash, comprises the following steps:

a) heating a heat transfer medium W in a first heat exchanger device up to a temperature T1, whilst cooling specifically the wort or mash, and b) heating at least one heat consumer of the brewery with this heat transfer medium W, wherein the heat transfer medium W cooled down in step b) is returned directly in the circuit K or indirectly (also without temporary storage in an energy storage tank) to the first heat exchanger device.

In this case, the heat transfer medium can be heated up to a very high temperature level, preferably >85° C., specifically >90° C. When entering the first heat exchanger device the heat transfer medium W preferably has a temperature T4 in a range of 60° C. to 90° C., with T4 being constant or being in a relatively small set range of T4±2° C. This means that the heat transfer medium is already relatively hot when it flows into the first heat exchanger device, and is brought to a higher temperature level by the first heat exchanger device. The temperature difference ΔT during the first heating of the heat transfer medium W in the first heat exchanger device is in a range ≤40° C. Thus, the heat transfer medium, which is used as heating medium for the heat consumers, can be brought to and kept at a high level.

The first heat exchanger device may also be split up upstream of and/or in and/or downstream of a possible device for the hot trub separation. If a hot trub separation is provided, it is advantageous if part of the thermal energy is provided upstream of the device for the hot trub separation, e.g. upstream of the whirlpool, as the subsequent formation of free DMS can thus be largely reduced.

Of course, the heat exchanger device is not limited to this embodiment. A heat exchanger device of this type can be employed on and in other devices used in beer-, beverage- or food-producing plants.

According to a preferred embodiment the second heat exchanger device allows the heating specifically of ice water from the ice water tank, or cold water from the cold water tank, to the second temperature T2, with T2<T1 and the second temperature T2 advantageously corresponding to a brewing water temperature in the range of not more than 60° C. to 85° C. Preferably, the heated water is stored in a hot water tank.

According to a preferred embodiment, after the heat transfer medium W was heated in the first heat exchanger device, the heat transfer medium W can be heated additionally to a temperature T3>T1, wherein the heat transfer medium W can be post-heated to the temperature T3 through a controlling and/or regulating device in a consumer- or process-dependent fashion (temperature- or quantity-dependent).

The method according to the disclosure also allows the direct or indirect heating or preheating of brewing water by means of an energy surplus or waste heat arising in the brewery, respectively, and the temporary storage thereof preferably in a hot water tank or brewing water tank, respectively.

BRIEF DESCRIPTION OF THE DRAWINGS

The present disclosure will be explained in more detail below by means of the accompanying drawings.

DETAILED DESCRIPTION OF THE PREFERRED EMBODIMENT

Figure 1:
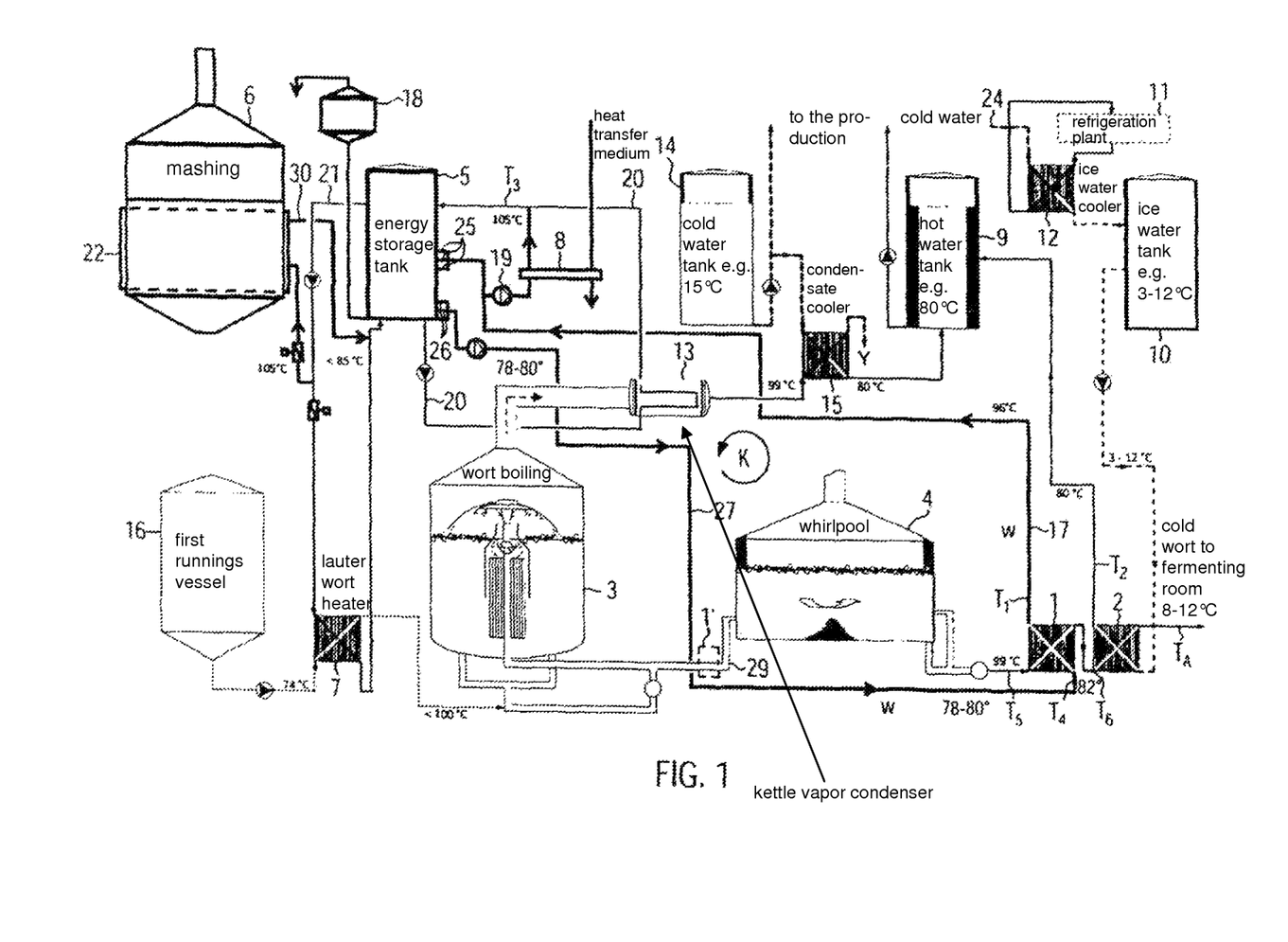
FIG. 1 shows, roughly schematically, a possible embodiment according to the present disclosure.

FIG. 1 shows, roughly schematically, an embodiment of the present disclosure, where energy is recovered from hot wort. It can be seen in FIG. 1 that the apparatus comprises a device for boiling or keeping hot the wort 3. Furthermore, a first runnings vessel 16 is provided, which contains the wort to be boiled. Moreover, a lauter wort heater 7 is provided upstream of the device for boiling or keeping hot the wort 3, which preheats the wort to be boiled/held, namely to a temperature≤boiling temperature (e.g. 100° C.). The device for boiling the wort exemplarily shown in this assembly comprises an internal boiler, by means of which the wort is boiled atmospherically. Of course, the wort boiling process may also be carried out continuously or discontinuously with other heat exchangers (e.g. external boilers).

Moreover, a device for separating the hot trub is provided, in this case in the form of a whirlpool 4. Finally, the apparatus comprises a first heat exchanger device 1 for heating a heat transfer medium W, which is arranged downstream of the device 3 for boiling or keeping hot the wort.

The heat exchanger device 1 can be designed, for example, as a plate cooler. According to the counterflow principle the wort flows against one side thereof and the heat transfer medium W flows against the other side thereof. In this embodiment the first heat exchanger device is provided downstream of the hot trub separation device 4. It is also possible, however, that the first heat exchanger device 1', as shown by a dashed line, is arranged upstream of the device 4 for the hot trub separation. Thus, the new formation of DMS in the hot wort can be avoided.

Furthermore, according to the disclosure, a second heat exchanger device 2 is provided, further cooling down the wort, which had already been cooled down by the first heat exchanger device 1, to the pitching temperature TA (<15° C., e.g. 11° C.). Again, the second heat exchanger device 2 comprises at least one corresponding heat exchanger, in this case a plate cooler.

FIG. 1 further shows an ice water tank 10 in which ice water (which is additionally cooled brewing water) is stored and serves as cooling medium for the second heat exchanger device 2. For the production of the ice water, moreover, an ice water cooler 12, a refrigeration plant 11 as well as a cold water supplier 24 (brewing water) are provided. The cold water can also be taken from the cold water tank 14 (not shown).

Finally, the apparatus comprises a hot water tank or brewing water tank 9, respectively, in which hot water or brewing water, respectively, is stored for further usage, e.g. for mashing the mash, or for sparging during the lauter process.

Finally, the apparatus comprises an energy storage tank 5 in which heat transfer medium heated by the first heat exchanger device 1 can be stored. To this end, the energy storage tank may be provided with several storage ports 25 and several withdrawal ports 26 at different heights of the energy storage tank. As the temperature of the stored heat transfer medium in the stratified storage device increases from the bottom to the top, it is always possible to store or withdraw the heat transfer medium in a specific suitable temperature range. Thus, the foundation to use different heat suppliers and consumers is laid. The storage may also be accomplished in a flowing fashion, however, by means of a strata loading pipe, which is not shown. In this case, the heat transfer medium can be stored selectively in a specific height area, in correspondence with a specific temperature of the heat transfer medium. To be capable of setting a predetermined constant temperature T4 of the heat transfer medium, which is supplied to the first heat exchanger device 1, a device for setting the predetermined temperature T4 is provided which, specifically, can comprise at least one mixing valve, such that a heat transfer medium withdrawn at different heights is mixed correspondingly. To this end, also several temperature sensors and a controller may be provided. T4 is here constant, or is in a relatively small set value range of T4±2° C. Thus, a heat swing with an equalized energy balance can be realized, regardless of fluctuations of the energy used up in the heat consumer, and regardless of varying return temperatures 30 from a heat consumer.

This means that the heat transfer medium can be withdrawn from the energy storage tank to heat at least one heat consumer. The energy storage tank may be dimensioned such that it is capable of receiving enough heat transfer medium W for several heat consumers (e.g. for heating the mash or preheating the wort). In addition to cost advantages this also brings about thermotechnical advantages. As a rule, a larger storage tank is more cost-efficient than two single ones of the same size. One single, larger storage tank further has a better surface/volume ratio, accompanied by fewer heat losses. The piping expenditure is smaller, and also the expenses for insulation can be reduced.

The heat consumers comprised by the apparatus are here a heating device in the form of a heater (22) of a mashing device 6, and the above-noted lauter wort heater 7.

Figure 5:
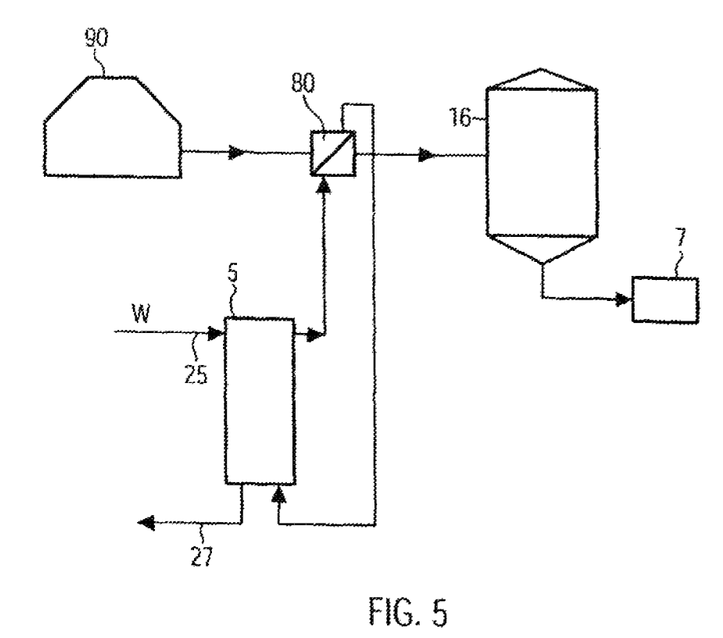
FIG. 5 shows roughly schematically another heat consumer according to the present disclosure.

Another lauter wort heater 80 may—as a heat consumer—also be provided between the lauter apparatus 90 (e.g. lauter tun or mash filter) and the lauter wort heater 7 (see FIG. 5). In this case, the heat consumer is located between the lauter apparatus 90 and the first runnings vessel 16. Using, for example, the already provided lauter pump, this would have the advantage that a relatively small heat exchanger apparatus can be employed, namely due to the low volume flow and heat flow. Thus, it is possible that the lauter wort temperature is raised, for example, by 10 to 15° C. only, resulting in a low thermal load on the wort and allowing the use of a heat transfer medium at a lower temperature level (heat transfer medium with a driving force, i.e. with a temperature of, for example, only 2° C. to 10° C. above the respective wort target temperature). This heat consumer may 100% be heated by the heat transfer medium W.

The heating device in the form of a heater 22 for the mashing device is designed to have a good heat transfer coefficient. For heating, the heat transfer medium flows through the heating device, thereby heating a contact surface pointing to the mash. Preferably, the contact surface comprises pocket-shaped elevations so as to enhance the heat transfer. This design makes it possible to obtain a k-value of usually 1800-2500 W/m²K, so that the heating by means of the liquid heat transfer medium, which is heated by the heat exchanger device 1 and flows through the circuit K, and thus the energy swing according to the disclosure become feasible in a reasonable fashion.

The heating device need not necessarily be within a vessel, but may also be designed as an external heat exchanger.

For heating the at least one heat consumer, e.g. 6 and/or 7 a heat swing is provided, with a heat transfer medium W being carried in circuit K.

The device for boiling or keeping hot the wort 3 is further connected to a kettle vapor condenser 13, by means of which additional thermal energy may be supplied to the heat transfer medium. With the vapor or condensate of the kettle vapor condenser also water may be heated by the additional heat exchanger 15 and supplied to the hot water tank 9, or the heat transfer medium of the energy storage tank may be post-heated (not shown).

Finally, a device 8 is provided between the first heat exchanger device 1 and, for example, the heat consumer 6, 7, which can heat the heat transfer medium W additionally. The device 8 can likewise be realized by a heat exchanger, by another heat transfer medium heating up the heat transfer medium W to a higher temperature. The heat exchanger device 8 may also be disposed in the energy storage tank. The energy storage tank 5 is, in this case, connected to an expansion tank 18.

The method according to the disclosure will be explained in more detail below by means of the apparatus illustrated in FIG. 1.

Wort from a first runnings vessel 16 is initially supplied to a lauter wort heater 7, e.g. at a temperature of 74° C., and is preheated by the lauter wort heater 7, specifically to a temperature≤boiling or keeping hot temperature. In a conventional fashion the wort can then be boiled in a wort boiling device so as to reach a temperature≥boiling temperature. Instead of the wort boiling device shown in FIG. 1, also a device for keeping hot the wort may be used, in which the wort is kept at a high temperature level (below boiling temperature), e.g. 85° C. to 99° C., over a specific period. Of course, the wort boiling process may also be carried out under overpressure or underpressure at the pressure-corresponding temperatures. The hot wort is now conducted through conduit 29 to a device for separating the hot trub, specifically a whirlpool 4.

In the process direction downstream of the device for boiling or keeping hot the wort 3, the wort freed from the hot trub then passes the first heat exchanger device 1. The wort has, for example, a temperature T5 in a range of 90° C. to 99° C., in this case preferably 99° C.

In this heat exchanger device the wort is now cooled to a temperature T6, e.g. in a range of 75° C. to 85° C., in this case 82° C. A heat transfer medium W, for example in the form of water, cooling agent, heat transfer oil etc., serves to cool down the wort. The heat transfer medium W is, in this case, heated to a higher temperature level. In this specific embodiment the inflow temperature T4 of the heat transfer medium into the first heat exchanger device 1 is in a range of about 60° C. to 90° C., advantageously 75° C. to 85° C. The inflow temperature T4 is kept constant or is kept in a constant range.

When the wort is cooled down to the pitching temperature TA, e.g. 11° C., a total amount of heat $Q_G$ is extracted from the wort, wherein the first heat exchanger device extracts a first amount of heat $Q_1$ from the hot wort. In this case, the heat transfer medium is heated at any rate to temperatures >85° C., preferably >90° C., in this specific embodiment to 96° C., such that the heat transfer medium W is capable of heating a heat consumer. Advantageously, the temperature T1 should be higher by about 5° C. to 60° C. than the temperature to which, for example, the medium to be heated, e.g. the mash or the wort, is to be heated in the heat consumer 6, 7.

Figure 2:
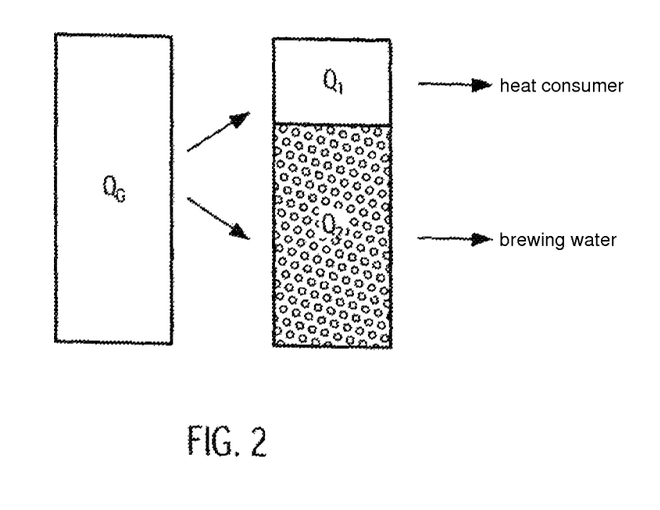
FIG. 2 schematically shows an exemplary heat amount distribution of the amount of heat released during the cooling of the wort.

As can be seen particularly in FIG. 2, the amount of heat $Q_1$ is extracted from the total amount of heat $Q_G$, which is released as the wort is cooled down, the amount of heat $Q_1$ advantageously amounting to at least 20% of the total amount of heat $Q_G$.

Even though not shown in this embodiment, it would be possible to already cool down the wort to the pitching temperature TA in the first heat exchanger device 1, thereby heating the heat transfer medium W to a high temperature.

In this particularly advantageous embodiment a second heat exchanger stage with a second heat exchanger device 2 is provided, however, by means of which the wort is cooled down from an inflow temperature T6 to the pitching temperature TA. As can particularly be seen in FIG. 2, a second amount of heat $Q_2$ is, in this case, extracted from the wort. Advantageously, water is, in this case, heated to a brewing water temperature of 60° C. to 85° C. and conducted to a hot water tank or brewing water tank 9, respectively. The temperature T2, to which the water is heated, is here at any rate lower than T1, i.e. the temperature to which the heat transfer medium is heated. For example, cold water or ice water from an ice water tank 10, which may have a temperature of 3° C. to 12° C., serves as cooling agent in the second heat exchanger device. The ice water was produced by means of a refrigeration plant 11 and an ice water cooler 12.

This now means that the total amount of heat $Q_G$, which is released at the pitching temperature TA, is split up as follows: $Q_G=Q_1+Q_2$ (with $Q_2=Q_n$, if the second heat exchanger device is composed of several n heat exchangers, i.e. if additional heat exchanges are activated in addition to the heat exchanger shown in FIG. 1). This now advantageously means that the energy which, as described in the introductory part of the description, had so far been discarded, can now be effectively used to heat at least one heat consumer, e.g. 6 and/or 7. By extracting a first amount of heat $Q_1$, whilst cooling down the wort at the same time, a hot water surplus in tank 9 can be avoided. In certain cases an energy surplus can still be present just the same, which can be extracted by means of additional heat exchangers (heat exchanger stages) $Q_n$ and stored temporarily (e.g. for the future use as rinsing water), for example, in a hot water tank having a lower temperature level than the brewing water tank.

Other than in this embodiment, the hot water could also be heated to a temperature T2, which is slightly below the brewing water temperature (as required, for example, for certain brewing processes in the brewery). Additional devices may then be provided for further heating the hot water heated by the second heat exchanger device. Additionally or alternatively to this, it is also possible that additional heat exchangers 15 heat up cold water to brewing water temperature. The amount of heat for heating the water is then gained from an energy surplus or waste heat, respectively, especially from hot water vapor or condensate from a kettle vapor condenser 13. This hot water, too, is then conducted to the hot water tank 9 or the energy storage tank 5.

The heat transfer medium W heated in the first heat exchanger device 1 is then introduced through a storage port 25 into the energy storage tank 5, at a height corresponding to the temperature. To determine the corresponding storage port, the temperature of the heat transfer medium can be determined and compared with the storage tank temperatures, and be introduced at the respective position by switching non-illustrated valves. This may be accomplished by an automatic controlling and regulating device.

In an upper portion of the energy storage tank, by means of a non-illustrated valve switching system, the hot heat transfer medium can be supplied through conduit 21 to at least one heat consumer. In this case, the heat consumer is the heating device, in the form of a heater 22, of the mashing device 6. The heating-up rate in the mashing device 6 can be adjusted, for example, by adjusting the flow rate and the temperature of the heat transfer medium. The cooled down heat transfer medium flows out of the heating device 22 through conduit 30 and is, either directly, supplied to the first heat exchanger device 1 in circuit K, or is initially introduced again into the energy storage tank 5, namely into the lower portion thereof, where the heat transfer medium cools down, preferably by 10-20° C. If the heat transfer medium is conducted back into the energy storage tank 5, it will then be recirculated through a withdrawal port, which corresponds to the temperature, via conduit 27 in circuit K to the first heat exchanger device 1. In this case, too, a temperature measurement may be carried out in order to choose the port. The controlling and regulating device then chooses a specific port and opens it by non-illustrated valves. Also, the heat transfer medium can be brought to a specific constant temperature T4 by at least one mixing valve, by withdrawing the heat transfer medium, for example through several withdrawal ports, and mixing it correspondingly.

The plurality of withdrawal ports 26, which are distributed across the height, thus allow an easy setting of the return temperature adapted to the respective process (e.g. by a mixing valve). The heat transfer medium, which is now recirculated again to the heat exchanger device 1, has a constant temperature T4 in a range of 60° C. to 90° C., such that the heat exchanger device 1 now allows the heat transfer medium to be raised to a higher temperature level. Preferably, the temperature difference ΔT during the heating of the heat transfer medium W in the first heat exchanger device 1 is in a range ≤40° C., i.e. preferably 10° C. to 25° C. Thus, it can be ensured that a sufficient amount of heat transfer medium on a high temperature level can be provided. To generate a heat swing it is, therefore, also important that the energy absorption on the heat consumer, in particular the heating device 22 of the mashing device 6, is good enough to obtain a return temperature of the heat transfer medium, in particular a temperature T4, which allows to extract a specific amount of heat $Q_1$ from the hot wort.

The amount of heat Q refers to the amount of heat per unit, i.e. for example to the amount of heat per brew, or, for example in the continuous beer brewing, to the amount of heat per unit of produced wort.

As was described before, the heat transfer medium W is then again conducted through conduit 17 in the circuit into the energy storage tank 5, or directly to a consumer.

The heat swing as described above is capable of heating at least one heat consumer 6, 7, or also additional heat consumers. If necessary, e.g. at the beginning of a new week, in order to compensate for losses occurred over the weekend or the like, or in the event of insufficient energy or too low a temperature level in special borderline cases, a device 8 heating the heat transfer medium W additionally may be provided between the first heat exchanger device 1 and the heat consumer, e.g. 6, 7. A controlling and/or regulating device (not shown) determines whether the amount of hot water and the temperature in the energy storage tank 5 are sufficient for the demand of the heat consumers, and then additionally activates the device 8. The device 8 may likewise be a heat exchanger device, and the heat transfer medium is then supplied, for example, from conduit 17 via pump 19 to this device 8, and is heated by this device 8 to a temperature which is higher than the temperature T1 (e.g. to up to 130° C. or up to 140° C.). This heated heat transfer medium W is then conducted into the upper portion of the energy storage tank 5. Also, it is possible to additionally heat only a part of the heat transfer medium W. Moreover, this post-heating device may also be arranged directly in/on the energy storage tank.

Finally, it is also possible to withdraw, through a conduit 20, heat transfer medium W from the lower portion (or, as was described above, also through different ports in the lower portion, which are not shown, however) of the energy storage tank 5 and heat it with the aid of the kettle vapor condenser 13, by a respective heat exchanger device therein, to a higher temperature, and conduct it (possibly through different ports) into the upper portion of the energy storage tank 5.

In addition to or as an alternative to the heating device 22 of the mashing device 6 also a lauter wort heater 7 or another heat consumer may be heated by the heat transfer medium W. In this case, too, the cooled down heat transfer medium is recirculated again into the lower portion of the energy storage tank 5 (shown only in one point).

The energy swing according to the disclosure yields the following advantages:

By means of the present disclosure an energy surplus can be effectively recovered as the wort is cooled down to the pitching temperature. The amount of heat released as the wort is cooled down can be utilized effectively, at least partially, for heating up a heat consumer. Thus, no primary energy, or only a small portion thereof, has to be used for heating up the heat consumer, e.g. a heating device of a mashing device. This means that approximately 40% of primary energy can be saved in the total brewhouse process. At the same time, a brewing water surplus can be prevented. Especially if the overall evaporation is higher, plenty of energy is produced, which can be usefully recirculated into the process by means of the present disclosure.

Brewing water may also be used as heat transfer medium W, so that the energy storage tank 5 and the hot water tank 9 can be combined. The apparatus according to the disclosure has the advantage, however, that the heat transfer medium may have a separate circuit, i.e. the heating medium and the hot water are separated, so that mineral deposits (calcification) in the heat exchangers and system components involved can be effectively prevented.

Also for food-hygienic reasons it is an advantage if the hot water circuit or brewing water circuit, respectively, and the heat transfer medium circuit or heating medium circuit, respectively, are separated.

Owing to the closed heat transfer medium circuit the feeding of fresh water is dispensable, which reduces costs for both raw materials and disposal and, moreover, is environment-friendly.

The energy stored in the hot wort can, thus, be utilized effectively to heat the heat transfer medium to a high temperature level. The apparatus can be very easily integrated in already existing systems, even if these are operated with other heat transfer media (e.g. breweries operated with vapor or high-pressure hot water), and is easy to retrofit. Owing to the above-described energy swing the heat transfer medium can be brought over and over again to a sufficiently high temperature in order to heat the heat consumer.

Figure 3:
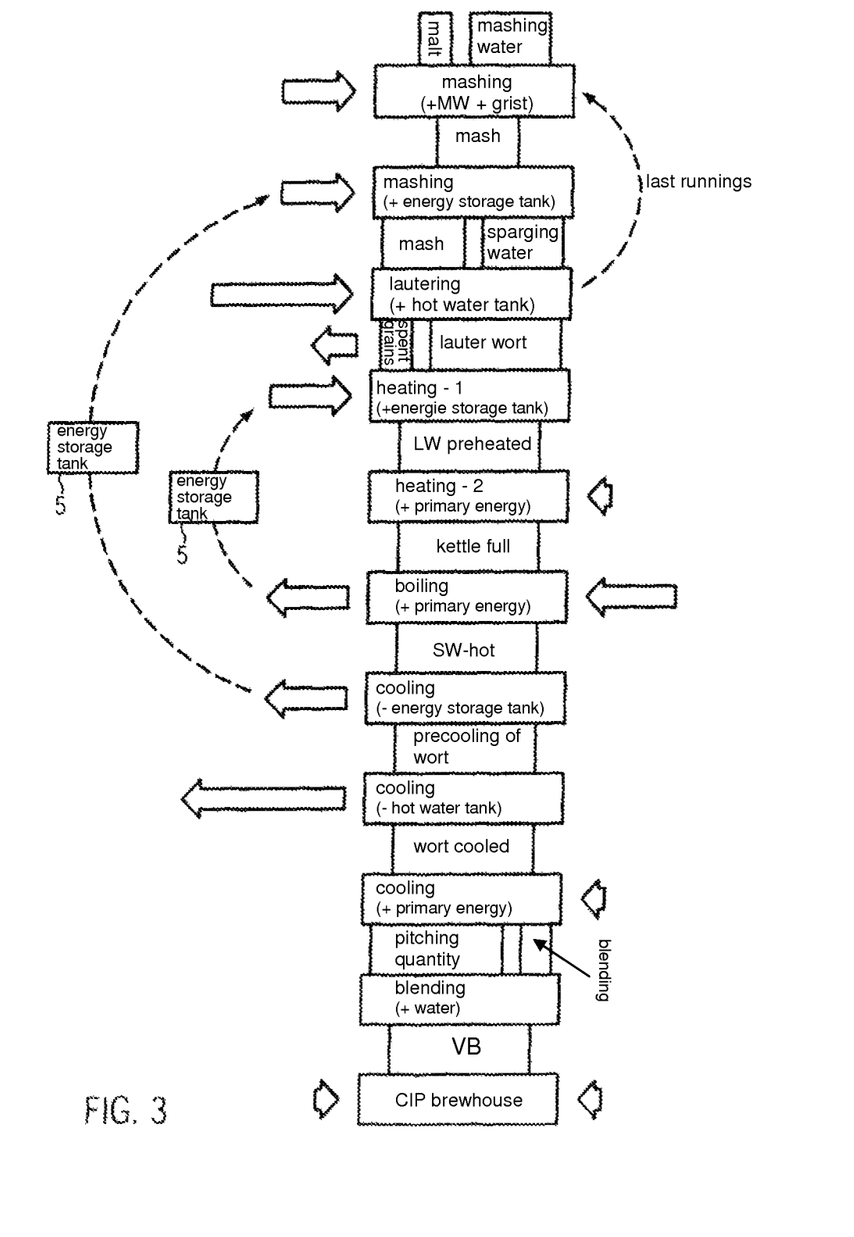
FIG. 3 shows a block diagram illustrating the method according to the disclosure.

FIG. 3 shows the essential steps of the brewhouse process, and illustrates once again the energy swing according to the disclosure. The arrows pointing to the individual process steps represent the supplied energy, while the arrows pointing away from the individual steps indicate an energy withdrawal (similar to a Sankey diagram). As is specifically shown in FIG. 3, an amount of heat can be extracted during the cooling of the hot wort, which is, in terms of amount, substantially sufficient to heat up the mash during the mashing. During the boiling of the wort it is possible to extract such an amount of heat, for example by means of the kettle vapor condenser, that is sufficient, in terms of the amount, to heat up the lauter wort.

As the wort is further cooled to the pitching temperature, a sufficient amount of heat can be extracted to bring cold water or ice water to a desired brewing water temperature. Only if required in the individual case can an additional amount of heat be supplied to the energy circuit.

Figure 4:
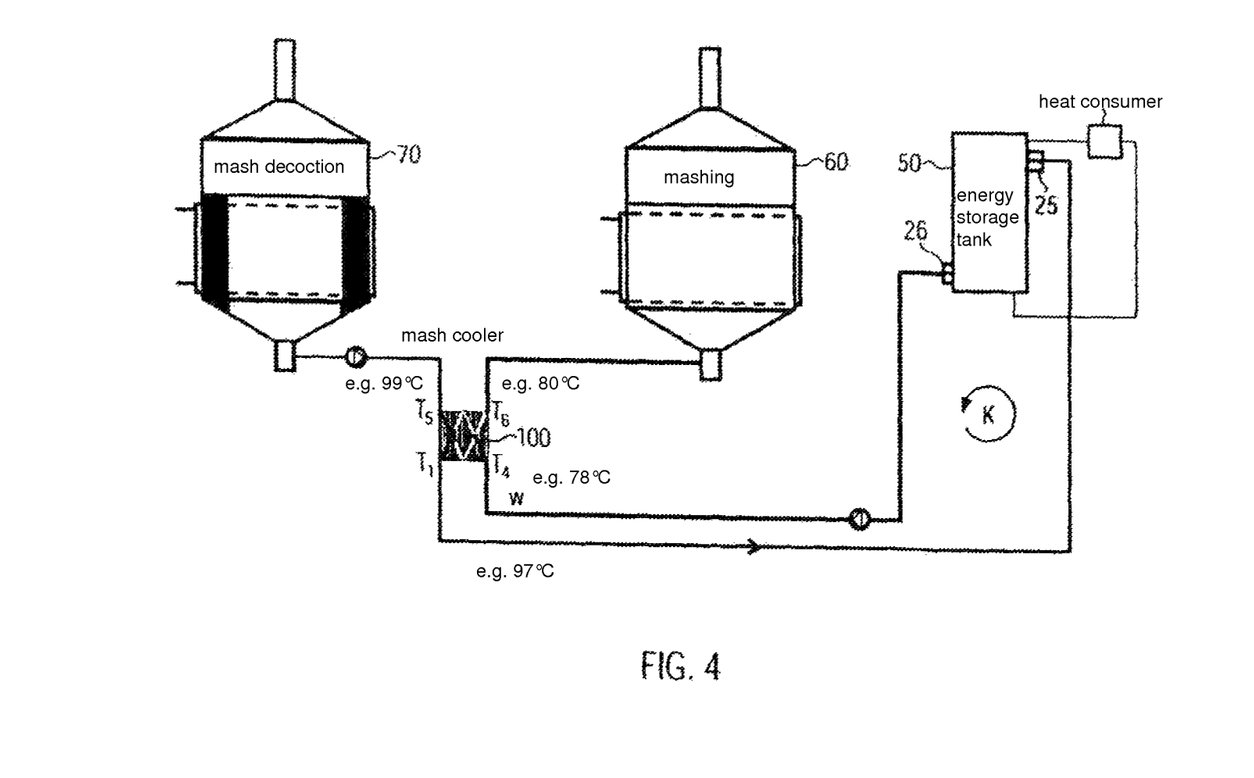
FIG. 4 shows roughly schematically a second embodiment according to the present disclosure.

FIG. 4 shows another embodiment of the present disclosure. With this apparatus and the corresponding method, which substantially correspond to the first embodiment, energy is now recovered from hot mash. To this end, mash is supplied from a mashing device 70, in which hot mash, specifically decoction mash, is stored at a temperature T5 of 90° C. to 100° C., to a first heat exchanger device 100, and is cooled down to a temperature T6, in this case for example 80° C., whilst heating the heat transfer medium W, and is supplied, for example, to another mashing device 60. Similarly, the recovered energy from hot mash can be increased in the temperature level (not shown), for example, by a kettle vapor condenser.

As the mash is cooled down the heat transfer medium W is heated up from a temperature T4 to a temperature T1, in this case for example 97° C., and—as was also described in connection with the first exemplary embodiment—is supplied to the energy storage tank 50. The energy storage tank 50 may be a separate energy storage tank. It is also feasible, however, to introduce the amount of heat recovered in this case into the energy storage tank 5 shown in FIG. 1. In accordance with the first embodiment the hot transfer medium W is stored, corresponding to the temperature, via a storage port 25, which corresponds to the temperature, in the energy storage tank 50. From there, the heat transfer medium W can then be supplied to a heat consumer, e.g. 6, 7 of the preceding example, or to the heating device of the mashing device 60 or 70, or to another heat consumer (e.g. CIP). The cooled down heat transfer medium is then conducted back again into the lower portion of the energy storage tank 50, or directly to the first heat exchanger device 100. The heat transfer medium W is then heated again in the first heat exchanger device and supplied in circuit K to the energy storage tank 50. Apart from that, the details described in connection with the first embodiment, with respect to the temperatures, amounts of heat and additional heat exchangers, apply equally to the second embodiment. Specifically, the embodiment shown in FIG. 4 only includes a single-stage cooling. It is also possible, however, to provide a single-stage or multi-stage cooling, as in the first embodiment.

As in the above-described embodiments no more primary energy is now being used for heating the heat consumers, the classical periphery for the primary energy supply can be realized in substantially smaller dimensions and in a more cost-effective fashion.

In the above-described embodiments, the energy storage tank 5 is provided in the circuit K. It is also feasible, however, to conduct the heat transfer medium W directly to the heat consumer and back to the heat exchanger in the circuit.

If the energy storage tank contains an energy surplus, the energy in the energy storage tank can be extracted again for other consumers by a heat exchanger. To this end, a heat exchanger can be used, for example, directly on the energy storage tank (e.g. pillow plate), or a corrugated heat exchanger tube may be introduced into the energy storage tank (not shown).

The exemplary embodiments described above relate to the recovery of energy from hot wort or mash by the first heat exchanger device, so as to heat heat consumers with this energy. Similarly, the energy can be recovered from other hot media used in the brewery, e.g. last runnings, rinsing water, cleaning medium or trub. The heated heat transfer medium can then be supplied, for example, to a respective heat storage tank or to a common one.

The system according to the disclosure may also be used for plants in which the wort is pressure-boiled. If, for example, the whirlpool is pressurized, too, energy with an even higher temperature level can be gained by the first heat exchanger 1.

According to a preferred embodiment it is also possible to release energy, specifically for heating, to several different heat consumers from a single energy storage tank 5, 50. Also, it is possible to conduct the heat transfer medium from the energy storage tank to energy suppliers, for them to absorb energy, and conduct it back to the tank. From the energy storage tank the heat transfer medium can then again be supplied in the circuit, at a predetermined constant temperature, to the heat exchanger, i.e. specifically to the first heat exchanger, from which the heat transfer medium is conducted back to the energy storage tank.

The invention claimed is:

1. An apparatus for the recovery of energy from one of a liquid hot wort or a hot mash for a beer brewery, comprising:

a first heat exchanger device for a heat transfer medium, which is adapted such that the heat transfer medium is heated by said first heat exchanger device while the liquid hot wort or hot mash is cooled down by said first heat exchanger device, the heat transfer medium is heated up to a temperature level T1 in the first heat exchanger device, a second heat exchanger device which is adapted such that water is heated up to a temperature of T2<T1, while the liquid hot wort or hot mash from the first heat exchanger device is cooled down by said second heat exchanger device, a heat transfer medium circuit comprising the first heat exchanger device and at least one heat consumer, a brewing water circuit comprising the second heat exchanger device, wherein at least one heat consumer of the brewery is heatable with the heat transfer medium that was heated by said first heat exchanger device, the heat transfer medium cooled down during the heating of the heat consumer is supplied in circuit back to the first heat exchanger device, and the heat transfer medium circuit and the brewing water circuit are separated, wherein the heat consumer is at least one of a heating device of a mashing device or a wort heater.

2. The apparatus of claim 1, wherein, when the liquid hot wort or hot mash is cooled down to a pitching temperature TA, a total amount of heat QG is extracted from the liquid hot wort or hot mash, wherein the second heat exchanger device extracts an amount of heat Q2 heating water to the temperature T2, and the first heat exchanger device extracts an amount of heat Q1 for heating the heat transfer medium to the temperature T1, with Q1=QG Q2.

3. The apparatus of claim 1, wherein a water tank is provided in which the heated water is stored.

4. The apparatus of claim 3, further comprising one further additional heat exchanger which heats water conducted into the water tank, wherein the amount of heat for heating the water is gained from one of an energy surplus and a waste heat.

5. The apparatus of claim 1, wherein the water is heated up to the temperature T2 of not more than 85° C.

* * * * *

UNITED STATES PATENT AND TRADEMARK OFFICE
CERTIFICATE OF CORRECTION

PATENT NO. : 10,676,704 B2  
APPLICATION NO. : 13/517993  
DATED : June 9, 2020  
INVENTOR(S) : Helmut Kammerloher Page 1 of 1

It is certified that error appears in the above-identified patent and that said Letters Patent is hereby corrected as shown below:

In the Claims

At Column 14, Line 12, Claim 2: "Q1=QG Q2." should be -- Q1=QG-Q2. --.

Signed and Sealed this  
Seventeenth Day of November, 2020

Andrei Iancu  
*Director of the United States Patent and Trademark Office*